United States Patent

[11] 3,597,836

[72] Inventors Takashi Tanaka
Osaka;
Yasuo Nomura, Hyogo, both of, Japan
[21] Appl. No. 822,926
[22] Filed May 8, 1969
[45] Patented Aug. 10, 1971
[73] Assignee Matsushita Electric Industrial Co., Ltd.
Osaka, Japan
[32] Priority May 21, 1968, May 21, 1968, May 22, 1968, Oct. 12, 1968, Dec. 2, 1968
[33] Japan
[31] 43/43015, 43/43016, 43/43065, 43/74786 and 43/105714

[54] METHOD OF MANUFACTURING A MULTICHANNEL MAGNETIC HEAD
1 Claim, 12 Drawing Figs.

[52] U.S. Cl. .......... 29/603, 179/100.2
[51] Int. Cl. .......... H01f 7/06
[50] Field of Search .......... 29/603; 179/100.2 C; 346/74 MC; 340/174.1 F

[56] References Cited
UNITED STATES PATENTS 3,082,509 3/1963 Lawrance .......... 29/603
3,246,383 4/1966 Peloschek et al. .......... 29/603
3,353,261 11/1967 Bradford et al. .......... 29/603

*Primary Examiner*—John F. Campbell
*Assistant Examiner*—Carl E. Hall
*Attorney*—Wenderoth, Lind & Ponack ABSTRACT: A multichannel magnetic head. The head has a plurality of magnetic tip cores which are separated magnetically from each other by nonmagnetic materials and each having a magnetic gap. A plurality of magnetic back cores are connected to said magnetic tip cores, and a plurality of windings are wound on said back cores. Certain of said plurality of magnetic gaps are aligned in one straight line and the remainder are aligned in another straight line. The two straight lines are perpendicular to the direction of tape movement of a recording and reproducing device.

A method of making the multichannel head is to provide a magnetic plate and adhere to it stacks of alternating magnetic material and nonmagnetic material blocks. Thereafter, slots are cut at the joints between the blocks and nonmagnetic plates inserted in the slots. The resulting assembly is trimmed appropriately and back cores are attached to it and connected to the tip cores.

INVENTORS
TAKASHI TANAKA
YASUO NOMURA

BY Wenderoth, Lind & Ponack
ATTORNEYS

INVENTORS
TAKASHI TANAKA
YASUO NOMURA

BY Wenderoth, Lind & Ponack
ATTORNEYS

INVENTORS
TAKASHI TANAKA
YASUO NOMURA

BY Wenderoth, Lind & Ponack
ATTORNEYS

INVENTORS
TAKASHI TANAKA
YASUO NOMURA

BY *Wenderoth, Lind & Ponack*
ATTORNEYS

METHOD OF MANUFACTURING A MULTICHANNEL MAGNETIC HEAD

BACKGROUND OF THE INVENTION

1. Field of the Invention

This invention relates to a multichannel magnetic head and to a method for making such a multichannel magnetic head.

2. Prior Art

A conventional multichannel magnetic head is merely a combination of a plurality of elementary magnetic heads which are magnetically separated from each other by nonmagnetic materials such as organic resins or ceramics. In such a construction it is important that all the magnetic gaps of this plurality of elementary magnetic heads be aligned in one straight line for simultaneous recording and reproducing and for compatibility of different recording and reproducing devices. There has, however, been difficulty in aligning all the magnetic gaps of the elementary magnetic heads in one straight line during manufacture of such a multichannel magnetic head. In addition, in a conventional multichannel magnetic head having such a construction, there is difficulty in reducing the crosstalk between adjacent channels. In the conventional multichannel head, one possible way to reduce the crosstalk is to insert shielding plates between adjacent elementary heads. But sometimes crosstalk is not sufficiently reduced by shielding. Another possible way is to magnetically separate a plurality of elementary heads by using nonmagnetic materials having a large size. A large size, however, is not desirable for a multichannel magnetic head having a high track density.

SUMMARY OF THE INVENTION

An object of the present invention is to provide a multichannel magnetic head which allows only minimum crosstalk between adjacent channels.

Another object of the invention is to provide a multichannel magnetic head having a high track density.

A further object of the invention is to provide a method for making a multichannel magnetic head allowing only minimum crosstalk between adjacent channels and having a high track density.

The multichannel magnetic head according to the invention comprises a plurality of magnetic tip cores which are separated magnetically from each other by nonmagnetic materials and each having a magnetic gap. A plurality of magnetic back cores are joined to said magnetic tip cores, and each has a winding wound thereon. Certain of said magnetic gaps are aligned in one straight line while the remainder are aligned in another straight line. The two straight lines are perpendicular to the direction of tape movement through a recording and reproducing apparatus.

These and other objects of the invention will be apparent from the following detailed description taken together with the accompanying drawings.

BRIEF DESCRIPTION OF THE FIGURES

FIGS. *1a—1d* are a plan view, a front elevation view, a side elevation view and a perspective view, respectively, of one embodiment of the multichannel magnetic head according to the present invention.

FIGS. *2a—2d* are similar views of another embodiment; and

DESCRIPTION OF PREFERRED EMBODIMENTS

Figure 1A:
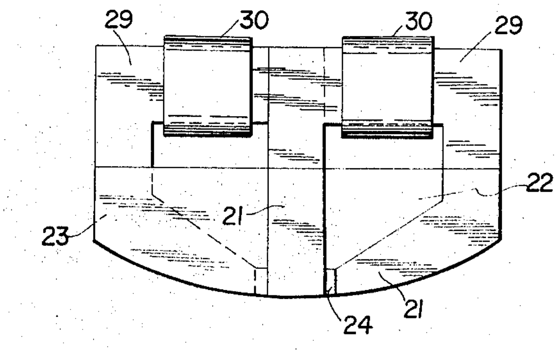
Figure 1B:
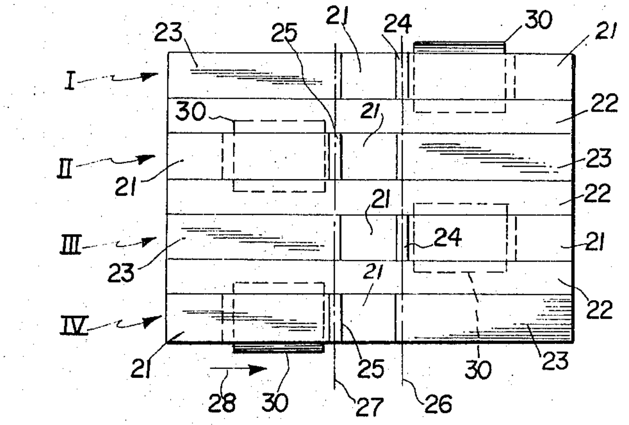
Figure 1C:
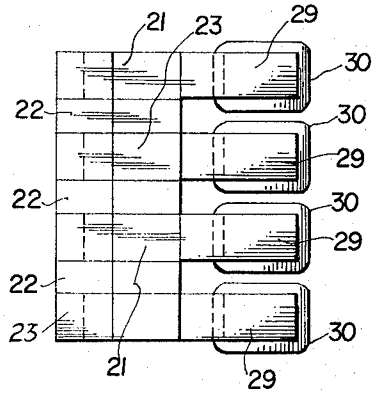
Figure 1D:
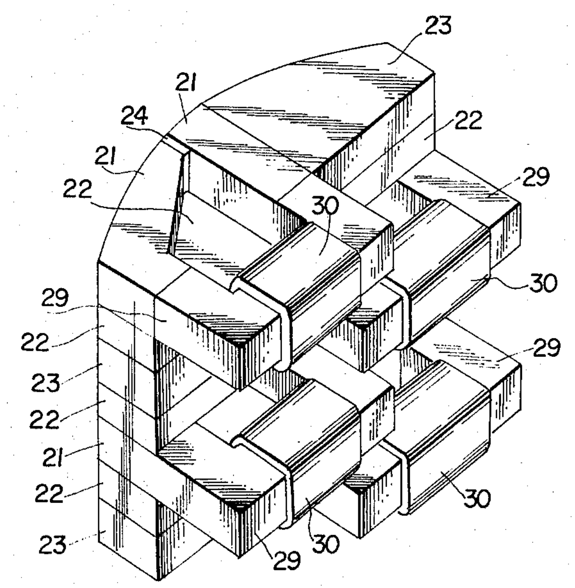

Referring to FIGS. *1a—1d* and *2a—2d*, a plurality of magnetic tip cores 21 are stacked in a stack and are separated magnetically from each other by layers 22 and 23 of nonmagnetic materials. Certain of said plurality of magnetic tip cores 21 each has a magnetic gap 24 and each of the remainder has a magnetic gap 25. All of said magnetic gaps 24 are aligned in a first straight line 26 perpendicular to the direction of tape movement as shown by an arrow 28. All of said magnetic gaps 25 are aligned in a second straight line 27 perpendicular to said direction of tape movement and parallel to said first line 26. Each of said magnetic tip cores 21 has a magnetic back core 29 joined thereto. A winding 30 is wound on each of said back cores 29.

The windings 30 are spaced from each other in the embodiment of FIGS. *1a—1d* by having alternate windings laterally offset from each other in a direction transverse to the said vertical lines 26 and 27. Thus the windings 30 for the second and fourth magnetic tip cores 21 in the stack of cores are vertically aligned and laterally offset from the windings 30 for the first and third magnetic tip cores. All of the windings 30 are in the same general plane. As a result, crosstalk is reduced.

Alternatively, it is possible for each of said magnetic back cores to have a different shape from that of the adjacent cores, such as shown in FIGS. *2a—2d*, in order to provide a sufficient spacing between each pair of windings and in order to reduce the crosstalk. In such a case, it is desirable that said magnetic back cores have different magnetic permeabilities or different cross-sectional areas at which they are joined to said magnetic tip cores or are jointed to said magnetic tip cores with different spaces therebetween, so that said magnetic back cores have magnetic reluctances which are essentially the same as each other. In the embodiment shown, the back core 29 for the winding 30 for the first magnetic tip core 21 in the stack is bent upwardly out of the plane of the magnetic tip core, while the back core 29 for the second magnetic tip core 21 in the stack is extended rearwardly of the plane of the first winding 30. Thus, the windings 30 on these two back cores 29 are spaced in the direction of the stacking of the magnetic tip cores 21 as well as laterally of this direction having a greater distance than the windings 30 of FIGS. *1a—1d*. The back cores 29 of the third and fourth magnetic tip cores 21 are in the same relationship, the third back core being extended rearwardly and the fourth back core being bent downwardly. Clearly other permutations and combinations of these and similar arrangements are possible and will be apparent to those skilled in the art.

Figure 3:
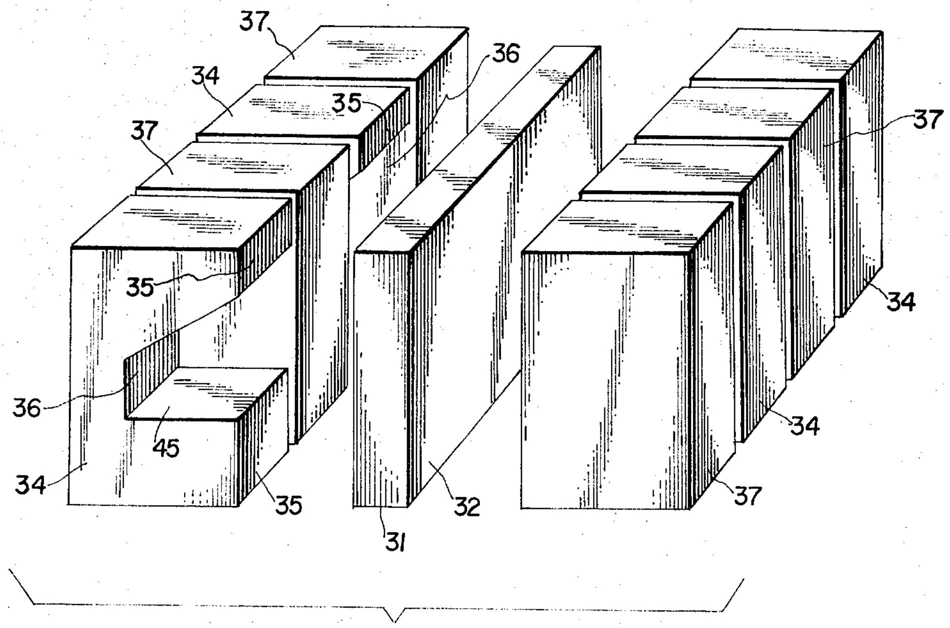
FIGS. 3 to 6 are perspective views showing the method of making a multichannel magnetic head according to the invention.

The above-mentioned multichannel magnetic head is made by the following process. Referring to FIG. 3, the first step is to provide a magnetic plate 31 having major opposite surfaces 32 (only one surface 32 is visible in the drawing) which are smoothly polished and are parallel to each other.

The second step is to provide a plurality of parallelepipeds 34 of magnetic material, each of which has one surface 35 smoothly polished and each having at least one groove 36 across the polished surface 35. It is preferable that the smoothness of said surfaces 32 of said magnetic plate 31 and said surfaces 35 of said magnetic parallelepipeds 34 be such that the irregularities project less than 1 micron, because two of these surfaces abutting each other will then form a magnetic gap which at the most has a length less than several microns.

The third step is to provide a plurality of parallelepipeds 37 of nonmagnetic material which are similar in shape to said plurality of magnetic material parallelepipeds 34.

Figure 4:
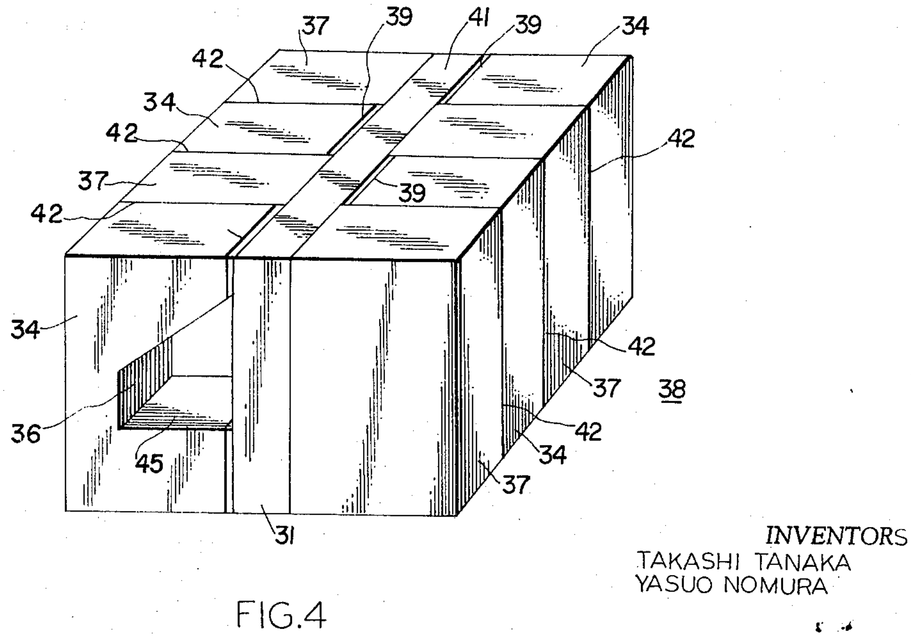

The fourth step is to form a composite body 38, as shown in FIG. 4, with alternating magnetic material parallelepipeds 34 and nonmagnetic material parallelepipeds 37 adhered to each other and to the magnetic plate 31 with the nonmagnetic parallelepipeds 37 adhered to one of said major surfaces 32 of said magnetic plate 31 and with a gap filled with adhesive between the polished surface 35 of each magnetic parallelepiped 34 and said one major surface 32. Alternating magnetic material parallelepipeds 34 and nonmagnetic material parallelepipeds 37 and similarly adhered to the other of said major surfaces 32 at positions with nonmagnetic material parallelepipeds 37 opposite magnetic material parallelepipeds 34 and vice versa. Said magnetic gaps 39 form the two magnetic gaps 24 and 25 described with reference to FIG. 1. The adhesion is effected by using any available and suitable adhesive such as epoxy resin or glass.

It is preferable that all the members of said composite body 38 are made of similar kind of materials from the view point of wear resistance. For example, when said magnetic plate 31 and said magnetic material parallelepipeds 34 are made of oxides such as Mn-Zn ferrite, said nonmagnetic parallelepipeds 37 can be made of ceramics such as Zn-ferrite. The Mn-Zn ferrite bodies and Zn-ferrite bodies are adhered together by glass which fills magnetic gaps 39. When said nonmagnetic material parallelepipeds 37 and said magnetic gaps 39 are material such as bronze, then said magnetic plate 31 and said magnetic parallelepipeds 34 can be of metal such as permalloy.

Figure 5:
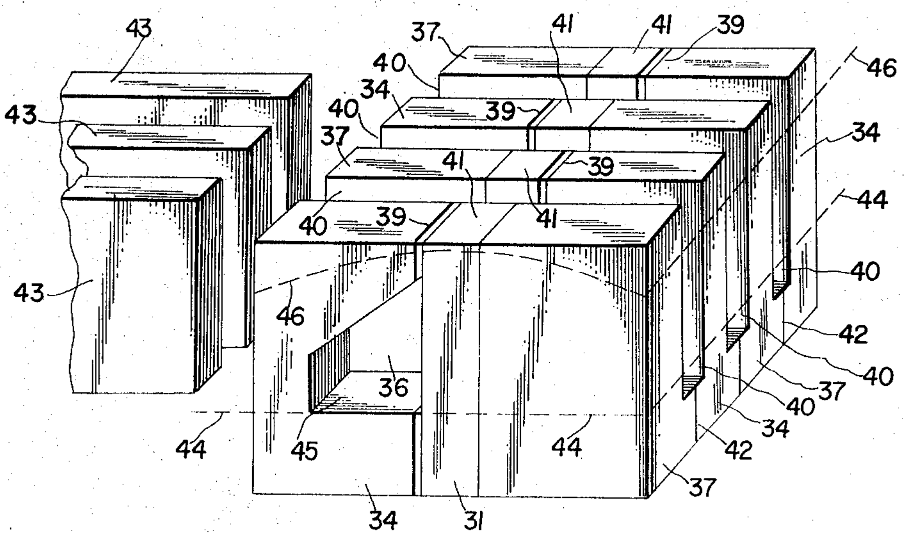

The fifth step is cut slots 40 having a parallelepiped form and which are perpendicular to both the edge surfaces 41 and major surface 32 of said magnetic plate 31. Slots 40 are cut at each boundary line 42 between a magnetic material parallelepiped 34 and a nonmagnetic material parallelepiped 37. Said slots 40 each has a width corresponding to the space between adjacent tracks on a tape and a depth extending into the material of the magnetic material parallelepipeds 34 beyond the remote sidewall plane 45 of grooves 36, as shown in FIG. 5. It is possible to provide slots at other locations than at said boundary lines 42 in addition to said slots 40 at said boundary lines 42.

The sixth step is to insert into said slots 40 nonmagnetic plates 43 having essentially the same size as said slots 40, and to adhere said nonmagnetic plates 43 to said composite body 38.

Figure 6:
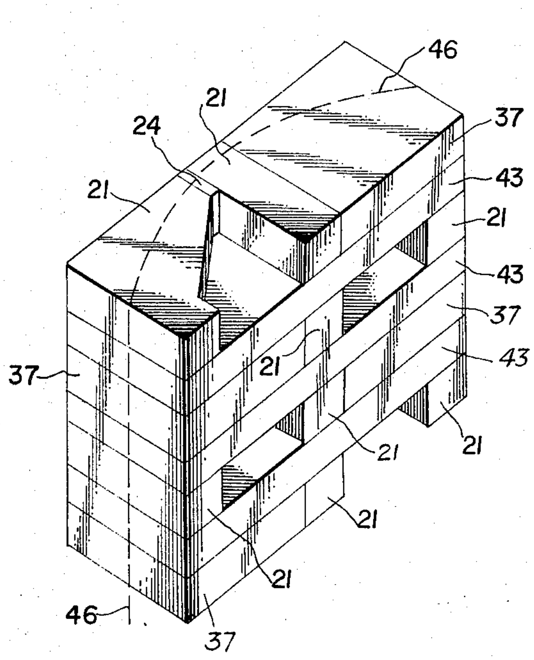

The seventh step is to cut the resultant composite body in a 44, shown by broken lines in FIG. 5, which is parallel to said edge surfaces 41 of said magnetic plate 31 and which is essentially coincident with the bottom plane 45 of said grooves 36 so that the part of composite body 38 having said grooves 36 therein forms a stack of tip cores 21 separated magnetically from each other by said nonmagnetic plates 43. Said stack of tip cores 21 is shown in FIG. 6. Each of said plurality of tip cores 21 consist of said magnetic plate 31 and the remaining portion of the magnetic material parallelepipeds 34 of FIG. 4. Said nonmagnetic plates 43 and said nonmagnetic material parallelepipeds 37 of FIG. 6 correspond to the nonmagnetic materials 22 and 23 of FIGS. 1*a*—*1d* and 2*a*—*2d*, respectively. The front surface having the magnetic gaps 39 therein is formed into a curved surface by removing material to the broken line 46 in FIGS. 5 and 6.

The eight step is to join a plurality of magnetic back cores 29 having windings 30 thereon to said plurality of magnetic tip cores 21, as shown in FIGS. 1*a*—*1d* and 2*a*—*2d*, using any available and suitable adhesive. It is not necessary that said magnetic back cores 29 be made of the same material as the magnetic tip cores 21.

Figure 2A:
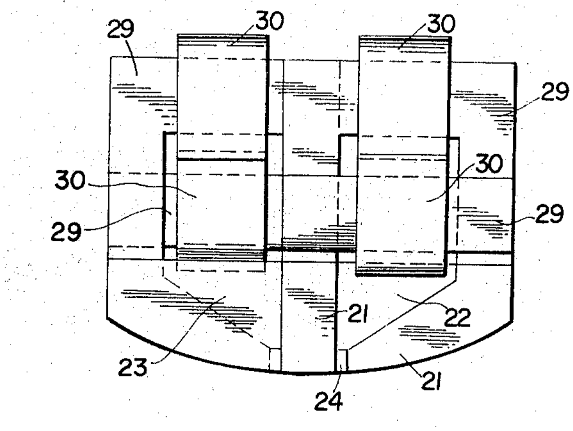
Figure 2B:
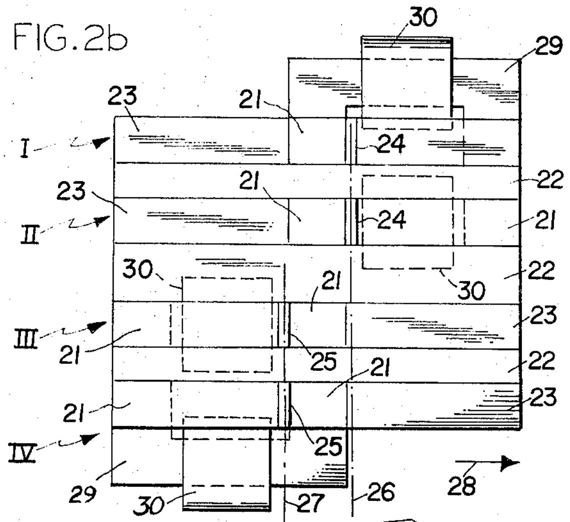
Figure 2C:
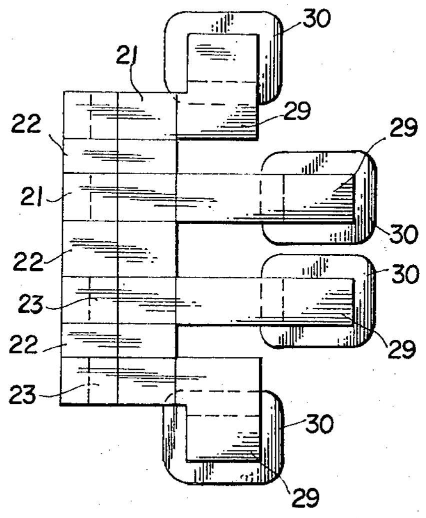
Figure 2D:
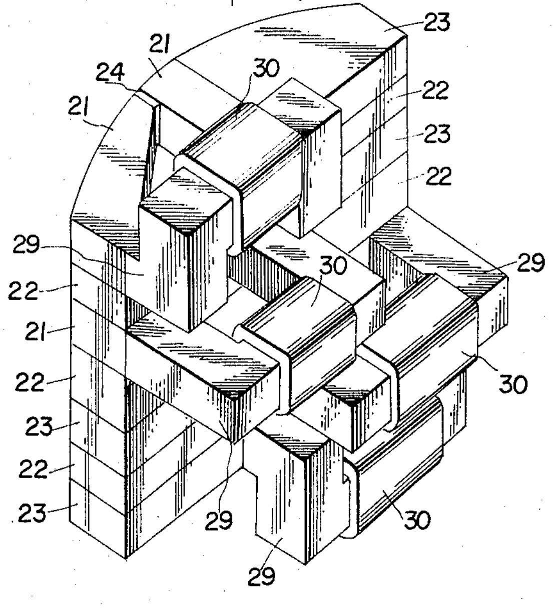

The novel multichannel magnetic head according to the invention allows less crosstalk than does a conventional multichannel head which has the magnetic gaps aligned in one straight line. A practical embodiment of the novel multichannel magnetic head shown in FIGS. 2*a*—*2d* has four elementary heads I, II, III and IV, the space 22 between elementary heads I and II or III and IV being about 0.32 mm. and the space 22 between elementary heads II and III being about 0.71 mm. With such a construction, the crosstalk between elementary heads I and II or III and IV is about −35db. and the crosstalk between elementary heads II and III is about −50db.

According to the method of this invention, a multichannel head can be made of magnetic and nonmagnetic ferrites so that the head has a very long life.

We claim:

1. A method for making a multichannel magnetic head comprising:

1. providing a magnetic plate having major opposite surfaces which are smoothly polished and are parallel to each other;
2. providing a plurality of magnetic material parallelepipeds each of which has one surface smoothly polished and having at least one groove across the polished surface;
3. providing a plurality of nonmagnetic material parallelepipeds having a shape similar to that of said magnetic material parallelepipeds;
4. forming a composite body by adhering alternating magnetic material parallelepipeds and nonmagnetic material parallelepipeds to each other in two stacks, and adhering one stack to each of said major opposite surfaces of said magnetic plate with the polished surfaces on the magnetic material parallelepipeds opposed to the said major surfaces with a magnetic gap between said magnetic plate and each of said magnetic material parallelepipeds, a magnetic material parallelepiped on one side of said magnetic plate being opposite a nonmagnetic material parallelepiped on the other side of said magnetic plate and vice versa;
5. cutting slots having a parallelpipedal form and perpendicular to both the edge surface and the maJor surfaces of said magnetic plate at least at each of the boundary lines between said magnetic material parallelepipeds and said nonmagnetic material parallelepipeds, said slots each having a width corresponding to a space between adjacent tracks on a tape and a depth extending to the remote sidewall plane of said grooves in said magnetic material parallelepipeds;
6. inserting into said slots nonmagnetic plates having essentially the same size as said slots;
7. cutting the resultant composite body at said remote sidewall plane parallel to said edge surfaces of said magnetic plate to form a stack of a plurality of tip cores separated magnetically from each other by said inserted nonmagnetic plates; and
8. joining a plurality of magnetic back cores having windings thereon to the respective tip cores.